(12) United States Patent
Asplund

(10) Patent No.: US 9,763,496 B2
(45) Date of Patent: Sep. 19, 2017

(54) SUSPENSION DEVICE AND A METHOD OF HANGING UP A TOOL OR OTHER OBJECT

(71) Applicant: Ake Asplund, Skelleftea (SE)

(72) Inventor: Ake Asplund, Skelleftea (SE)

( * ) Notice: Subject to any disclaimer, the term of this patent is extended or adjusted under 35 U.S.C. 154(b) by 0 days.

(21) Appl. No.: 14/779,632

(22) PCT Filed: Apr. 4, 2014

(86) PCT No.: PCT/SE2014/050415
§ 371 (c)(1),
(2) Date: Sep. 24, 2015

(87) PCT Pub. No.: WO2014/185849
PCT Pub. Date: Nov. 20, 2014

(65) Prior Publication Data
US 2016/0044996 A1    Feb. 18, 2016

(30) Foreign Application Priority Data
May 15, 2013    (SE) ...................................... 1300345

(51) Int. Cl.
| | | |
|---|---|---|
| A47G 1/10 | (2006.01) | |
| A44B 15/00 | (2006.01) | |
| A47G 29/10 | (2006.01) | |
| B25H 3/04 | (2006.01) | |
| F16M 13/02 | (2006.01) | |

(Continued)

(52) U.S. Cl.
CPC .............. *A44B 15/00* (2013.01); *A47G 29/10* (2013.01); *B25H 3/04* (2013.01); *F16B 45/04* (2013.01); *F16M 13/02* (2013.01); *F16B 2/12* (2013.01)

(58) Field of Classification Search
CPC ................................................. Y10T 24/45283
USPC .............. 248/685, 689, 154, 229.14, 229.16, 248/229.24, 229.26, 231.21, 231.61, 248/231.81, 231.85, 231.91, 316.1, 316.6, 248/322, 320, 326, 339, 110, 113; 211/85.9
See application file for complete search history.

(56) References Cited

U.S. PATENT DOCUMENTS 330,991 A * 11/1885 Mathews ............... F16M 13/02
                                                        24/343
1,409,056 A * 3/1922 Michaels ............... A47K 10/04
                                                        211/123

(Continued)

FOREIGN PATENT DOCUMENTS

DE    102007056740    5/2009
FR          2690326    10/1993

(Continued)

*Primary Examiner* — Terrell McKinnon
*Assistant Examiner* — Michael McDuffie
(74) *Attorney, Agent, or Firm* — Mark P. Stone

(57) ABSTRACT

A suspension device has a base plate (11) intended to be fastened to a wall and two rods (15, 16) fastened on the base plate with the ends pointing towards one another. The rods have end knobs (17, 18) and one end knob (18) is spring-loaded to rest against the end knob of the other rod. Using a closed loop, a snare is made around the object that is to be hung up and then the loop is pressed in between the ends of the rods so that the loop remains hanging on one rod. The cord can simply be pulled loose by pulling it out between the end knobs when it is desired to detach the object

12 Claims, 2 Drawing Sheets

(51) Int. Cl.
*F16B 45/04* (2006.01)
*F16B 2/12* (2006.01)

(56) References Cited

U.S. PATENT DOCUMENTS

| | | | | |
|---|---|---|---|---|
| 2,347,035 | A * | 4/1944 | Douglas | A47G 29/10 206/482 |
| 2,355,489 | A * | 8/1944 | Waddell | A47H 1/022 211/105.6 |
| 2,550,038 | A * | 4/1951 | Brown | F16G 15/04 24/374 |
| 2,565,440 | A * | 8/1951 | Soref | A47F 5/0876 211/123 |
| 2,617,537 | A * | 11/1952 | Henley | A47H 1/022 211/105.2 |
| 3,290,911 | A * | 12/1966 | Segal | A45C 11/323 24/598.3 |
| 4,339,045 | A * | 7/1982 | Bodin | A47G 29/08 174/66 |
| 4,413,801 | A * | 11/1983 | Lancaster | E06C 5/24 224/405 |
| 4,465,198 | A * | 8/1984 | Martin | A47K 10/04 211/105.3 |
| 4,894,944 | A * | 1/1990 | Jimenez | A01K 75/00 24/598.3 |
| 5,538,167 | A * | 7/1996 | Winner | B62J 11/00 224/425 |
| 5,582,377 | A * | 12/1996 | Quesada | A47F 5/083 24/343 |
| 5,794,905 | A * | 8/1998 | Richter | B43M 99/00 248/316.1 |
| 5,816,462 | A * | 10/1998 | Brantley | B60R 9/00 224/401 |
| 6,102,264 | A | 8/2000 | Redzisz | |
| 6,370,741 | B1 * | 4/2002 | Lu | A47B 21/045 24/523 |
| 7,837,166 | B2 * | 11/2010 | Liao | F16M 11/041 24/523 |
| 8,479,931 | B1 * | 7/2013 | Richards | A47H 1/022 211/105.2 |
| 8,720,841 | B2 * | 5/2014 | Morren | F16B 2/10 248/229.2 |
| 9,108,096 | B2 * | 8/2015 | Solheim | A63B 69/3632 |
| 2007/0045372 | A1 | 3/2007 | Cangemi, Jr. | |
| 2008/0083864 | A1 * | 4/2008 | Davis | F16B 45/02 248/339 |
| 2010/0287738 | A1 | 11/2010 | Amsalem | |
| 2016/0025263 | A1 * | 1/2016 | Gibbons | F16B 2/22 248/216.1 |

FOREIGN PATENT DOCUMENTS

| | | | |
|---|---|---|---|
| FR | 2690326 A1 * | 10/1993 | ............ A47G 29/10 |
| GB | 972910 | 10/1964 | |
| GB | 1471861 | 4/1977 | |
| NL | 6604596 | 9/1967 | |

\* cited by examiner

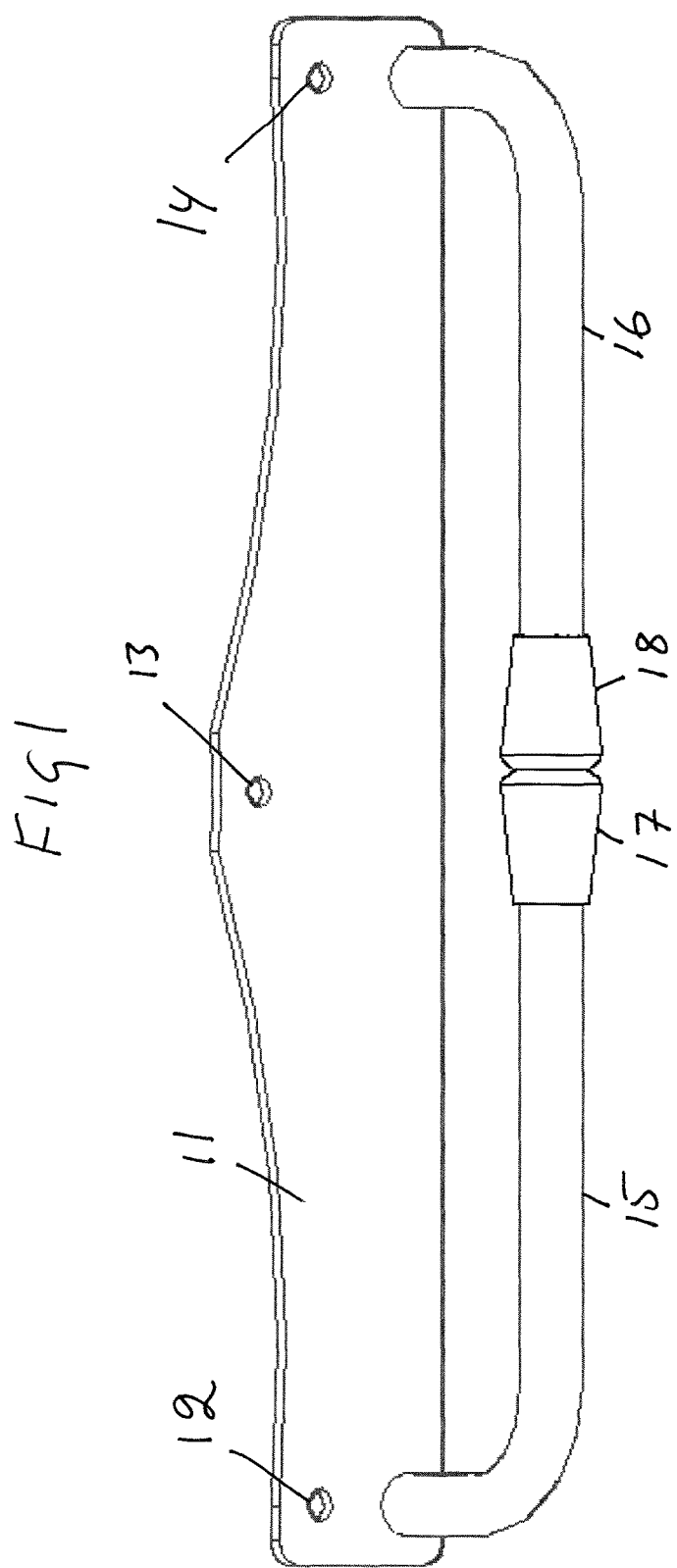

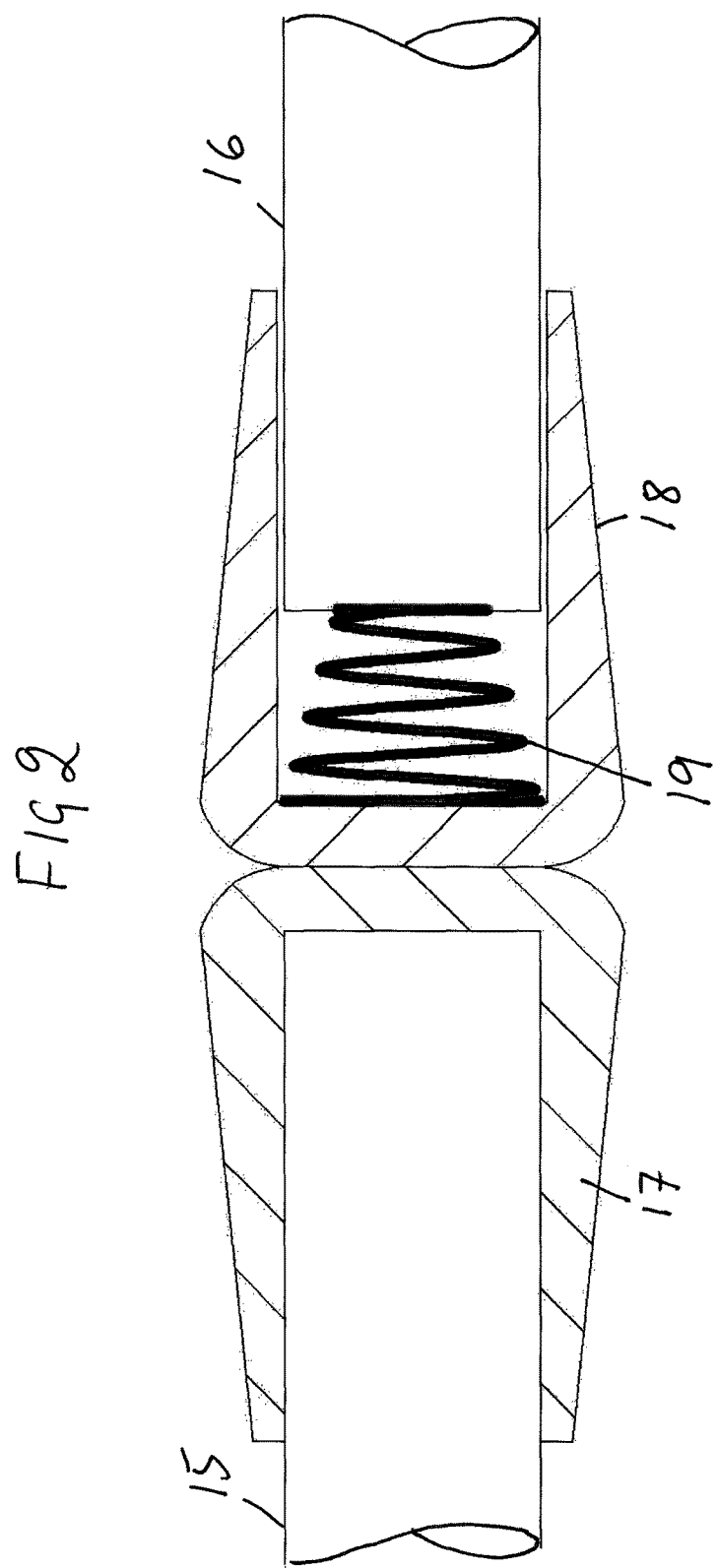

SUSPENSION DEVICE AND A METHOD OF HANGING UP A TOOL OR OTHER OBJECT

SCOPE OF THE INVENTION

The invention relates to a suspension device with a base plate intended to be fastened to a wall and suspension fixtures fastened on the base plate.

OBJECT OF THE INVENTION

An object of the invention is to provide simple suspension and detachment of objects in a suspension device.

BRIEF DESCRIPTION OF THE INVENTION

The object is achieved when the suspension fixtures consist of two rods fastened on the base plate pointing horizontally towards one another, wherein at least one rod (16) has an end knob that has a cylindrical blind hole, into which the rod is inserted, and a spring in the blind hole between the bottom of the hole and the end of the rod so that the end knob is tensioned against the end of the other rod, and the end knob and the end of the other rod have an initial angle in relation to one another such that a narrow object that is pressed against their contact surfaces will displace the end knob so that the object can pass into a gap between the contact surfaces.

A snare can then be made with a closed loop around the object and the loop pressed in between the ends of the rods, so that the loop remains hanging in one rod, and the desired cord loop can easily be pulled loose by pulling it out between the end knobs when it is desired to detach the object, regardless of the order in which the tools were suspended.

BRIEF DESCRIPTION OF THE DRAWINGS

FIG. 1 is a view in perspective of a suspension device according to the invention.

FIG. 2 is a section on a larger scale of a part of the device in FIG. 1.

DESCRIPTION OF THE EXAMPLE SHOWN OF THE INVENTION

The suspension device has a base plate 11 of metal with screw holes 12, 13, 14 for it to be able to be screwed firmly to a wall or other vertical surface. Two rods 15, 16 of metal are welded firmly by their ends to the base plate perpendicular to this. The rods are bent at a right angle so that they become coaxial with their ends pointing towards one another and the ends have end knobs 17, 18.

FIG. 2 shows the end knobs 17, 18 enlarged and in section. The cylindrical blind hole of the end knob 17 has a fit to the rod 15 while the cylindrical blind hole of the end knob 18 has a narrow gap to the rod 16. A spring 19 is placed in the end knob 18 and tensions between the bottom of the blind hole and the end of the rod 16 so that the distal end of the end knob 18 directly abuts and is tensioned against the distal end of the end knob 17. The ends of the end knobs are rounded so that they acquire an initial angle in relation to one another, which means that if a narrow object is pressed in between the end knobs, the end knob 18 will give way and the object will pass the end knobs.

When an object is to be suspended in the suspension device, a closed loop of cord is used to make a snare around the object. Then the cord is pressed in between the end knobs so that the cord loop will hang on one of the rods. When many cord loops hang on the hanger and it is desired to detach a particular one, the cord loops that are in the way are moved out of the way and the desired loop is guided to the contact surfaces of the end knobs and pulled tight so that there is a gap between the end knobs and the cord passes the end knobs. By having cord loops of different lengths, objects can be hung at different heights and room obtained for many objects.

For example, rings of metal can be used instead of cord loops and the suspension device can be adapted for objects such as key rings. The keys can then be hung relatively closely but it is still possible to detach the desired key.

The invention claimed is:

1. Suspension device with a base plate (11) intended to be fastened to a surface, and suspension fixtures (15, 16) fastened on the base plate, wherein the suspension fixtures consist of first and second rods (15, 16) fastened on the base plate pointing towards one another, wherein said first rod (16) has an end knob (18) that has a cylindrical blind hole into which the rod is inserted and a spring (19) in the blind hole between the bottom of the hole and the end of the rod, so that the end knob of said first rod directly abuts and is tensioned against an end (17) of the second rod, and the end knob (18) of the first rod and the end (17) of the second rod have an initial angle in relation to one another such that a narrow object that is pressed against respective contact surfaces of the end knob of the first rod and the end of the second rod will displace the end knob of the first rod so that the object can pass into a gap between the contact surfaces.

2. Suspension device according to claim 1, wherein the end of the second rod has an end knob (17) without a spring disposed therein.

3. Suspension device according to claim 1, wherein both of said first and second rods (15, 16) are welded to the base plate (11) at an angle relative to the base plate and have bends so that the rods are coaxially pointed towards one another.

4. Method of hanging up a tool or other object in a suspension device according to claim 1, wherein a snare is made with a closed loop around the object and then the loop is pressed in between the ends of the first and second rods so that the loop remains hanging on one of said first and second rods.

5. Suspension device according to claim 1, wherein said narrow object includes a key or key ring.

6. Suspension device according to claim 1, wherein said surface to which said suspension device is to be fastened includes a wall.

7. Suspension device according to claim 2, wherein both of said first and second rods (15, 16) are welded to the base plate (11) at an angle relative to the base plate and have bends so that the first and second rods are coaxially pointed towards one another.

8. Suspension device according to claim 2, wherein said narrow object includes a key or key ring.

9. Suspension device according to claim 3, wherein said narrow object includes a key or key ring.

10. Method of hanging up a tool or other object in a suspension device according to claim 2, wherein a snare is made with a closed loop around the object and then the loop is pressed in between the ends of the first and second rods so that the loop remains hanging on one of said first and second rods.

11. Method of hanging up a tool or other object in a suspension device according to claim 3, wherein a snare is made with a closed loop around the object and then the loop is pressed in between the ends of the first and second rods so that the loop remains hanging on one of said first and second rods.

12. Method of hanging up a tool or other object in a suspension device according to claim 5, wherein a snare is made with a closed loop around the object and then the loop is pressed in between the ends of the first and second rods so that the loop remains hanging on one of said first and second rods.

\* \* \* \* \*